United States Patent [19]
Flynn et al.

[11] Patent Number: 5,907,702
[45] Date of Patent: May 25, 1999

[54] METHOD AND APPARATUS FOR DECREASING THREAD SWITCH LATENCY IN A MULTITHREAD PROCESSOR

[75] Inventors: William Thomas Flynn; Philip Rogers Hillier, III, both of Rochester, Minn.

[73] Assignee: International Business Machines Corporation, Armonk, N.Y.

[21] Appl. No.: 08/829,518

[22] Filed: Mar. 28, 1997

[51] Int. Cl.[6] .................................................. G06F 9/00
[52] U.S. Cl. ........................................ 395/678; 395/677
[58] Field of Search .................................. 395/375, 392, 395/675, 677, 678, 670, 672

[56] References Cited

U.S. PATENT DOCUMENTS

| | | |
|---|---|---|
| 4,901,230 | 2/1990 | Chen et al. . |
| 4,926,323 | 5/1990 | Baror et al. . |
| 5,113,515 | 5/1992 | Fite et al. . |
| 5,179,702 | 1/1993 | Spix et al. . |
| 5,319,782 | 6/1994 | Goldberg et al. . |
| 5,357,617 | 10/1994 | Davis et al. .............................. 395/375 |
| 5,394,529 | 2/1995 | Brown, III et al. ..................... 395/375 |
| 5,442,756 | 8/1995 | Grochowski et al. . |
| 5,490,272 | 2/1996 | Mathis et al. . |
| 5,511,175 | 4/1996 | Favor et al. ............................. 395/375 |
| 5,515,538 | 5/1996 | Kleiman . |

OTHER PUBLICATIONS

Song, Peter; Microprocessor Report, vol. 11, No. 9, pp. 13–18, "Multithreading Comes of Age".

*Primary Examiner*—Majid A. Banankhah
*Attorney, Agent, or Firm*—Birch, Stewart, Kolasch & Birch, LLP; Karuna Ojanen

[57] ABSTRACT

The method and apparatus for decreasing thread switch latency in a multithread processor stores instructions for an active thread in a primary instruction queue, and stores instructions for a dormant thread in a thread switch instruction queue. The active thread is the thread currently being processed by the multithread processor, while the dormant thread is a thread not currently being executed by the multithread processor. During execution of the active thread, instructions are dispatched from the primary instruction queue for processing. When a thread switch occurs, instructions are dispatched from the thread switch instruction queue for execution. Simultaneously, instructions stored in the thread switch instruction queue are transferred to the primary instruction queue. In this manner, the thread switch latency resulting from the amount of time to refill the primary instruction queue with instructions of the dormant thread is eliminated.

15 Claims, 2 Drawing Sheets ns for each thread, while a memory sub-system such as a level two cache may store less than all the instructions for the various threads, but more instructions than the instruction cache 4. As shown in FIG. 1, the instruction cache 4 is also connected to the main memory and/or memory sub-system 2.

METHOD AND APPARATUS FOR DECREASING THREAD SWITCH LATENCY IN A MULTITHREAD PROCESSOR

BACKGROUND OF THE INVENTION

1. Field of the Invention

The present invention relates to a method and apparatus for decreasing thread switch latency in a multithread processor.

2. Description of Related Art

Today the most common architecture for high performance, single-chip microprocessors is the RISC, for reduced instruction set computer, architecture. As semiconductor technology has advanced, the goal of RISC architecture has been to develop processor designs that can come close to initiating one instruction on each clock cycle of the machine. This measure, clock cycles per instruction or CPI, is commonly used to characterize architectures for high performance processors. The architectural features of instruction pipelining and cache memories have made the CPI improvements possible. Pipeline instruction execution allows subsequent instructions to begin execution before previously issued instructions have finished execution. Cache memories allow instruction execution to continue, in most cases, without waiting the full access time of a main memory.

Although memory devices used for main memory are becoming faster, the speed gap between such memory chips and high-end processors is becoming increasingly larger. Accordingly, a significant amount of execution time in current high-end processor designs is spent waiting for cache misses, and it is expected that memory access delays will make up an increasing proportion of processor execution time unless memory latency tolerance techniques are implemented.

One known technique for tolerating memory latency is multithreading. Two types of multithreading exist: hardware multithreading and software multithreading. In general, hardware multithreading employs a processor that maintains the state of several tasks or threads on-chip. This generally involves replicating the processor registers for each thread.

There are two basic forms of hardware multithreading. A traditional form is to keep N threads, or states, in the processor and interleave the threads on a cycle-by-cycle basis. This eliminates all pipeline dependencies because instructions in a single thread are separated. The other form of hardware multithreading is to switch the threads on some long-latency event. A preferred embodiment of the present invention employs hardware multithreading and switches between threads on some long-latency event.

Thread switching itself, however, requires a number of clock cycles. A significant portion of the latency caused by a thread switch is attributable to the instruction fetch required to begin executing a new thread. FIG. 1 illustrates a prior art structure for dispatching instructions for processing by the plurality of pipelines of a multithread processor. As shown in FIG. 1, an instruction pass multiplexer 8 has a first and second input. The first input is connected to an instruction cache 4 which stores a plurality of instructions. The instructions stored by the instruction cache 4 belong to both the active thread, the thread currently being executed, and one or more dormant threads, threads not currently being executed. The second input of the instruction pass multiplexer 8 is connected to the main memory and/or memory sub-system 2. Main memory stores all the instruc- In accordance with a line fill bypass signal received from the control logic 6, the instruction pass multiplexer 8 outputs instructions addressed from either the instruction cache 4 or the main memory and/or memory sub-system 2 by the control logic 6. The instruction pass multiplexer 8 outputs the instructions to a primary instruction queue 10. The primary instruction queue 10 stores a plurality of instructions which it outputs for dispatch to the plurality of processing pipelines implemented by the multithread processor.

When a thread switch occurs, the instructions in the primary instruction queue 10 are invalidated, and during a first clock cycle, addresses for instructions of the dormant thread which is becoming the active thread are generated by the control logic 6. During the second clock cycle, instructions are addressed based on the newly generated instruction addresses, and the control logic 6 outputs a line fill bypass signal such that the instruction pass multiplexer 8 selects the input connected to the instruction cache 4. If the instructions being addressed are resident in the instruction cache 4, then during the third clock cycle, the instruction pass multiplexer 8 outputs these instructions to the primary instruction queue 10, and the primary instruction queue 10 outputs the instructions for dispatch to the processing pipelines. Accordingly, when the instructions of the dormant thread which is becoming the active thread are resident in the instruction cache 4, a thread switch takes three clock cycles to complete.

Of course, if the instruction cache 4 does not contain the instructions of the dormant thread which is becoming the active thread addressed by the control logic 6, then the time to complete the thread switch will increase by the amount of time required to resolve the instruction cache miss.

OBJECTS AND SUMMARY OF THE INVENTION

It is an object of the present invention to provide a method and apparatus for decreasing thread switch latency in a multithread processor.

It is another object of the present invention to provide a method and apparatus for decreasing thread switch latency in a multithread processor which eliminates from the amount of time required to perform a thread switch, the time to refill the primary instruction queue.

These and other objectives are achieved by providing a thread switch instruction queue, which stores instructions of a dormant thread, in addition to a primary instruction queue, which stores instructions of the active thread. The instructions stored in the thread switch instruction queue are output for execution when a thread switch occurs thereby eliminating the thread switch latency resulting from having to wait for the primary instruction queue to be refilled.

Additionally, while instructions of the dormant thread which is becoming the active thread are output from the thread switch instruction queue, some of the instructions stored in the thread switch instruction queue are transferred to the primary instruction queue. After the initial output of instructions from the thread switch instruction queue, instructions for execution are again obtained from the primary instruction queue. Because the primary instruction queue has been prefilled with instructions originally stored in the thread switch instruction queue, any further delays in filling the primary instruction queue are also eliminated.

Other objects, features and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

Of the above discussed figures, FIG. 2 is suggested for printing on the front page of a patent issuing on the subject application.

DETAILED DESCRIPTION OF THE PREFERRED EMBODIMENTS

The structure for dispatching instructions according to the present invention includes a thread switch instruction queue connected to the instruction pass multiplexer and an output multiplexer in parallel with the primary instruction queue. The thread switch instruction queue stores instructions of a dormant thread, while the primary instruction queue stores instructions of the active thread. The instructions stored in the thread switch instruction queue are output for execution by the output multiplexer when a thread switch occurs thereby eliminating the thread switch latency resulting from having to wait for the primary instruction queue to be refilled.

Additionally, while instructions of the dormant thread which is becoming the active thread are output by the output multiplexer, some of these instructions are transferred to the primary instruction queue. After the initial output of instructions obtained from the thread switch instruction queue, the output multiplexer again outputs instructions for execution obtained from the primary instruction queue. Because the primary instruction queue has been prefilled with instructions originally stored in the thread switch instruction queue, any further delays in filling the primary instruction queue are also eliminated.

Figure 1:
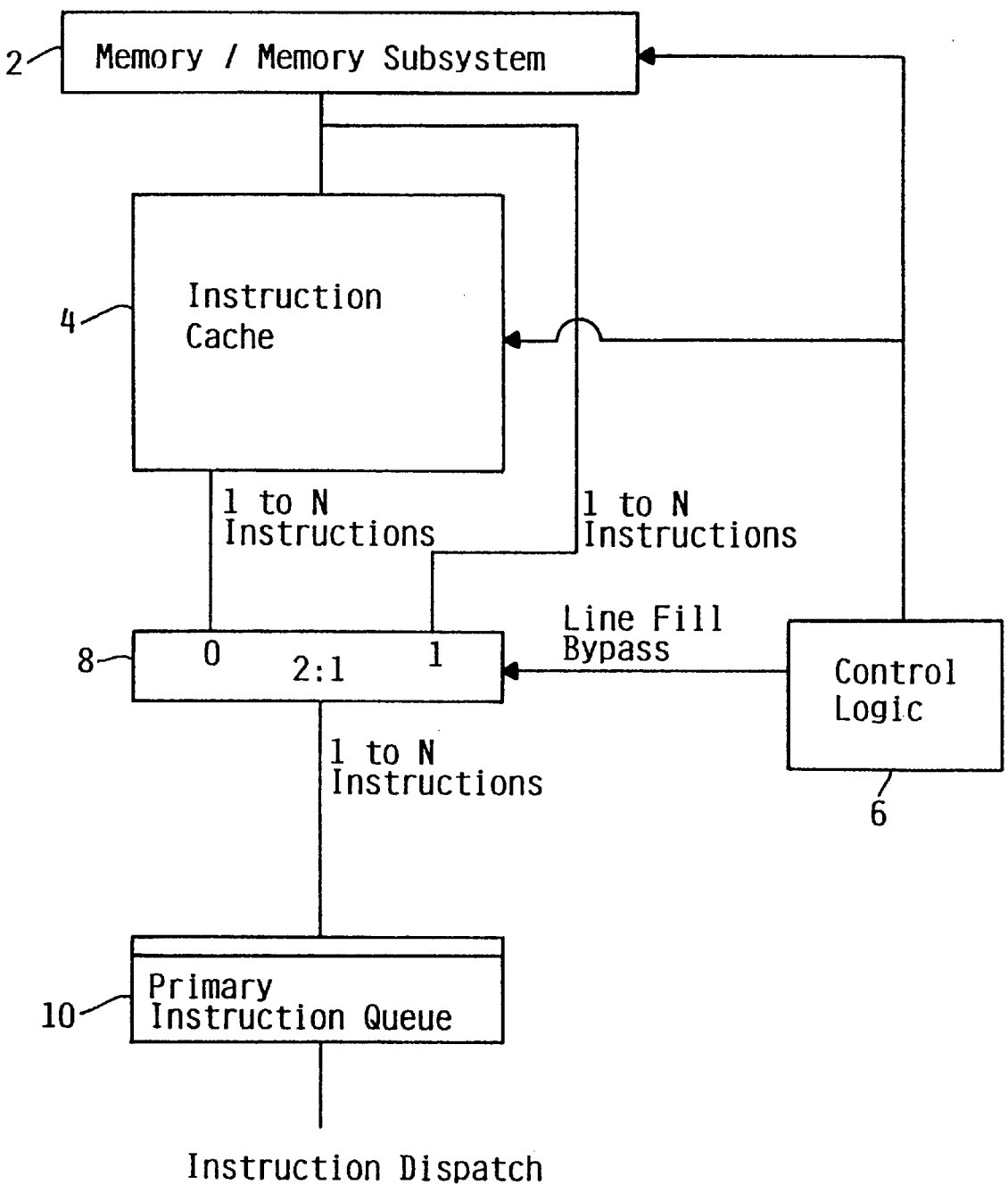
FIG. 1 illustrates a prior art structure for dispatching instructions.
Figure 2:
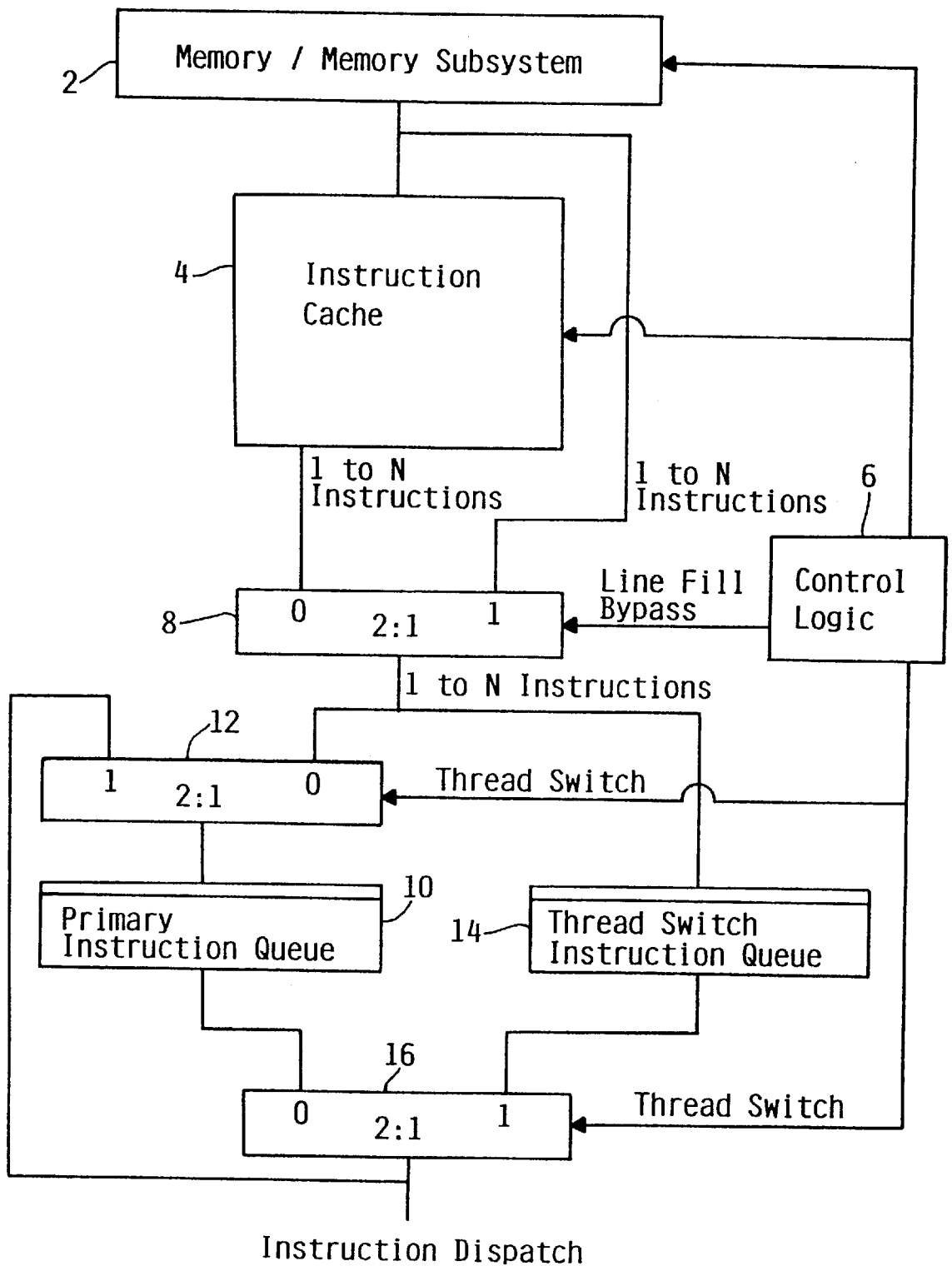
FIG. 2 illustrates the structure for dispatching instructions according to the present invention.

The structure for dispatching instructions according to the present invention will now be discussed in detail with reference to FIG. 2. As shown in FIG. 2, the instruction pass multiplexer 8, the control logic 6, the instruction cache 4, and the main memory and/or memory sub-system 2 are connected in the same fashion as discussed above with respect to the prior art instruction dispatch structure. Similarly, the control logic 6 outputs a line fill bypass signal to the instruction pass multiplexer 8 indicating whether the instruction pass multiplexer 8 should output instructions received from the instruction cache 4 or the main memory and/or memory sub-system 2.

The structure according to the present invention for dispatching instructions, however, also includes an instruction fill multiplexer 12, a thread switch instruction queue 14, and an output multiplexer 16. The instruction fill multiplexer 12 has a first and second input. The first input is connected to the output of the instruction pass multiplexer 8. The second input of the instruction fill multiplexer 12 is connected to the output of the output multiplexer 16. The instruction fill multiplexer 12 outputs instructions received from either the instruction pass multiplexer 8 or the output multiplexer 16 based on a thread switch signal received from the control logic 6 to the primary instruction queue 10.

The thread switch instruction queue 14 also receives the output of the instruction pass multiplexer 8, and both the thread switch instruction queue 14 and the primary instruction queue 10 send their output to the output multiplexer 16. The output multiplexer 16 selectively outputs instructions from either the primary instruction queue 10 or the thread switch instruction queue 14 based on the thread switch signal generated by the control logic 6. The instructions output by the instruction multiplexer 16 are dispatched to the plurality of processing pipelines of the multithread processor.

During execution of the active thread, the thread switch signal remains low such that the instruction fill multiplexer 12 outputs instructions received from the instruction pass multiplexer 8 to fill the primary instruction queue 10, and the output multiplexer 16 outputs instructions received from the primary instruction queue 10.

Furthermore, during execution of the active thread, instructions of the dormant thread are prefetched and stored in the thread switch instruction queue 14. To prefetch the instructions of the dormant thread for storage in the thread switch instruction queue 14, the control logic 6 uses clock cycles designated for prefetching instructions of the active thread to store in the primary instruction queue 10. The control logic 6 will steal these clock cycles when (1) the thread switch instruction queue 14 has not already been loaded with instructions of the dormant thread; (2) an instruction cache miss resulting from the prefetch of instructions for the dormant thread is not being processed; and (3) none of the branch instructions in the primary instruction queue 10 and none of the instructions being processed by the plurality of processing pipelines needs to access the instruction cache 4. If these conditions are met, then the control logic 6 generates addresses for the instructions of the dormant thread, accesses the instructions from at least one of the instruction cache 4 and the main memory and/or memory sub-system 2, and outputs a line fill bypass signal such that the instruction pass multiplexer 8 outputs the prefetched instructions of the dormant thread. The control logic 6 also enables the thread switch instruction queue 14 to store these instructions, and disables the primary instruction queue 10 from storing these instructions. For the sake of clarity, the enable/disable control lines from the control logic 6 to the primary instruction queue 10 and the thread switch instruction queue 14 have not been shown.

The size of the primary instruction queue 10 and the size of thread switch instruction queue 14 can be set based on desired operating characteristics. In a preferred embodiment, however, the size of the thread switch instruction queue 14 is set such that the thread switch instruction queue 14 stores more instructions than can be received in a single clock cycle by the plurality of processing pipelines.

When a thread switch occurs, the control logic 6 changes the state of the thread switch signal from low to high for one clock cycle. As a result, the output multiplexer 16 outputs the instructions stored by the thread switch instruction queue 14. Because the thread switch instruction queue 14 stores more instructions than can be received by the plurality of processing pipelines, the instructions not dispatched to the plurality of processing pipelines are received by the instruction fill multiplexer 12. The instruction fill multiplexer 12, in accordance with the state change of the thread switch signal, outputs instructions output by the output multiplexer 16 to the primary instruction queue 10. In this manner, in a single clock cycle, instructions from the dormant thread becoming the active thread are dispatched to the processing pipelines and transferred to the primary instruction queue 10.

After the completion of the clock cycle, the thread switch signal resumes its low state, and instructions are dispatched to the processing pipelines from the primary instruction queue 10 once again. Additionally, the control logic 6 begins prefetching instructions to fill the primary instruction queue 10 and the thread switch instruction queue 14.

Unlike the prior art structure, the instruction dispatch structure according to the present invention eliminates from the thread switch latency the amount of time required to fill and begin dispatching instructions from the instruction queue. Consequently, the present invention achieves a two-cycle reduction in thread switch latency as compared to the prior art.

It should be understood, that the present invention is not limited to the embodiment illustrated in FIG. 2. For instance, the present invention has been described above with respect to a multithread processor implementing only two threads. The multithread processor, however, could implement a plurality of threads wherein the control logic 6 stores, in the thread switch instruction queue 14, the instructions of the dormant thread most likely to become the active thread if a thread switch occurs. As a further alternative, a plurality of thread switch instruction queues each corresponding to a dormant thread could be provided, and the instruction fill multiplexer 12 and the output multiplexer 16 enlarged to accommodate the additional thread switch instruction queues.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed:

1. A method for decreasing thread switch latency in a multithread processor, comprising:

(a) storing instructions for an active thread in a primary instruction queue, said active thread being a thread currently executed by said multithread processor;

(b) storing instructions for a dormant thread in a thread switch instruction queue, said dormant thread being a thread not currently executed by said multithread processor;

(c) dispatching instructions from said primary instruction queue for execution during execution of said active thread;

(d) interrupting the dispatch of instructions from the primary instruction queue because the active thread experiences a cache miss and control logic generates a thread switch signal;

(e) switching execution from the active thread to the dormant thread as a result of the thread switch signal;

(f) dispatching instructions from said thread switch instruction queue for execution after said steps of interrupting (d) and switching (e).

2. The method of claim 1, wherein said step (f) dispatches a portion of said instructions stored in said thread switch instruction queue, and further comprising, (g) transferring instructions in said thread switch instruction queue not dispatched in step (f) to said primary instruction queue when switching execution from the active thread to the dormant thread.

3. The method of claim 1, further comprising:

(h) prefetching instructions of said dormant thread for storage in said thread switch instruction queue from at least one of an instruction cache and a main memory.

4. The method of claim 3, wherein said step (g) comprises:

(g1) determining whether any branch instructions in said primary instruction queue or dispatched for execution need to access said instruction cache;

(g2) determining whether an instruction cache miss, as a result of an dormant thread instruction prefetch, is being processed; and (g3) prefetching instructions for said dormant thread instead of instructions for said active thread when said step (g1) determines that no branch instructions in said primary instruction queue or dispatched for execution need to access said instruction cache and said step (g2) determines that an instruction cache miss as a result of an dormant thread instruction prefetch is not being processed.

5. The method of claim 1, wherein said thread switch instruction queue stores more instructions than can be dispatched for execution in a single processing cycle.

6. The method of claim 1, wherein said step (b) stores instructions for one of a plurality of dormant threads.

7. The method of claim 1, wherein said step (b) stores instructions for a plurality of dormant threads in a plurality of thread switch instruction queues, each thread switch instruction queue being associated with one of said plurality of dormant threads; and said step (f) dispatches instructions from said thread switch instruction queue corresponding to said dormant thread which is becoming active as a result of switching execution from the active thread to the dormant thread.

8. An apparatus to dispatch instructions for execution by a multithread processor, comprising:

a primary instruction queue storing instructions for an active thread, said active thread being a thread currently executed by said multithread processor;

at least one thread switch instruction queue storing instructions for a dormant thread, said dormant thread being a thread not currently executed by said multithread processor;

a dispatcher to dispatch instructions from said primary instruction queue for execution during execution of said active thread, and to dispatch instructions from said thread switch instruction queue for execution when a thread switch occurs; and control logic functionally connected to the dispatcher, the primary instruction queue, and the thread switch instruction queue which upon a cache miss by the active thread interrupts the dispatcher to discontinue dispatching instructions from the primary instruction queue and to dispatch instructions of the dormant thread thereby enabling a thread switch.

9. The apparatus of claim 8, wherein said dispatcher dispatches a portion of said instructions stored in said thread switch instruction queue for execution, and transfers instructions in said thread switch instruction queue not dispatched for execution to said primary instruction queue when the thread switch occurs.

10. The apparatus of claim 9, wherein said dispatching means comprises:

a first multiplexer receiving output of said primary instruction queue and output of said thread switch instruction queue, and outputting one of said output of said primary instruction queue and said output of said thread switch instruction queue based on a thread switch signal from the control logic; and a second multiplexer receiving output of said first multiplexer and instructions for storage in said primary instruction queue, and outputting one of said output of said first multiplexer and said instructions for storage in said primary instruction queue based on said thread switch signal.

11. The apparatus of claim 8, wherein said thread switch instruction queue stores instructions of said dormant thread prefetched from at least one of an instruction cache and a main memory.

12. The apparatus of claim 8, wherein said thread switch instruction queue stores more instructions than can be dispatched for execution in a single processing cycle.

13. The apparatus of claim 8, wherein said thread switch instruction queue stores instructions for one of a plurality of dormant threads.

14. The apparatus of claim 8, further comprising:

a plurality of thread switch instruction queues storing a plurality of dormant threads, each thread switch instruction queue being associated with one of said plurality of dormant threads; and wherein said dispatching means dispatches instructions from one of said plurality of thread switch instruction queues corresponding to said dormant thread which is becoming active as a result of a thread switch signal from the control logic.

15. The apparatus of claim 8, wherein said dispatching means comprises:

a multiplexer having one input connected to said primary instruction queue and another input connected to said thread switch instruction queue.

\* \* \* \* \*